United States Patent Office 3,001,995
Patented Sept. 26, 1961

3,001,995
β-CYANOVINYLAMINES
Everett J. Frazza, Yorktown Heights, N.Y., and Lorence Rapoport, Stamford, Conn., assignors to American Cyanamid Company, New York, N.Y., a corporation of Maine
No Drawing. Filed Dec. 24, 1957, Ser. No. 704,878
8 Claims. (Cl. 260—247)

This invention relates to a new class of compounds. More particularly, it relates to β-cyanovinylamines and the preparation thereof.

The new class of β-cyanovinylamines are prepared according to the process of this invention by the cyanovinylation of amines. More particularly, the products of this invention are obtained by reacting β-chloroacrylonitrile with an amine in an inert reaction medium preferably in the presence of a hydrogen chloride acceptor. On completion of the reaction, which is conducted at below about 100° F., the precipitate is separated by conventional means and the β-cyanovinylamine recovered from the residual liquor as by distillation or crystallization.

It is a feature of this invention that various amines can be readily reacted with β-chloroacrylonitrile to obtain a β-cyanovinylamine in good yield. In addition to ammonia, examples of aliphatic amines which may be employed in the process of this invention are primary and secondary alkylamines such as the methyl, ethyl, n-propyl, isopropyl, n-butyl, isobutyl, sec-butyl, t-butyl, isoamyl, n-hexyl, 2-ethylhexyl, n-octyl, t-octyl, dodecyl amines and the like; allylamines, such as allylamine, methylallylamine and the like; cycloalkylamines such as cyclopentylamine, methylcyclopentylamine, cyclohexylamine and the like; hydroxyalkylamines such as ethanolamine, propanolamine and the like; alkyldiamines such as ethylenediamine, pentamethylenediamine and the like; and heterocyclic amines such as morpholine, piperidine, methyl piperidine, dimethylpyridine, piperazine, pyrrole, pyrrolidine, and the like.

The particular reaction medium employed in the process of this invention is restricted only in that it be inert to the reactants and is preferably a solvent therefor. Any of the conventional materials, including water, generally employed in this capacity are suitable. Alcohols such as methanol; chlorinated aliphatic hydrocarbons such as carbon tetrachloride and trichlorethylene; aromatic hydrocarbons such as benzene and its homologues and their halogenated derivatives; amides such as dimethylformamide; esters such as ethyl acetate; ethers and the like may all be used. During the reaction, it is also preferable to have present an acceptor to fix the hydrogen chloride formed. Illustrative of the various materials which may be employed for this purpose are inorganic bases such as sodium carbonate and bicarbonate; tertiary amines such as triethylamine, N-ethylmorpholine, dimethylbenzylamine, tributylamine, pyridine, N-methylpyridine and the like. Since the reaction involves an amine, an additional mol of reactant amine over that employed for the reaction may be employed.

The compounds of this invention have various uses. For instance, they may be polymerized with other ethylenically unsaturated monomers to give copolymers containing basic centers. Copolymers of this nature find utility in the field of synthetic fibers when using acid dyes, as well as in other fields where basic centers in polymers are required such as in ion exchange resins, oil additives and the like. The β-cyanovinylamines of this invention are further useful as intermediates in the preparation of various products useful in various fields.

The following examples will further illustrate the invention. All parts are by weight unless otherwise indicated.

EXAMPLE 1

*Dimethyl-β-cyanovinylamine*

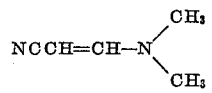

To a stirred solution of 135.3 parts of dimethylamine in 400 parts of benzene at 0° C. is added 87.5 parts of β-chloroacrylonitrile during a period of 65 minutes while maintaining the temperature below 15° C. After standing for three hours, 150 parts of benzene and 400 parts of ether are added and the by-product amine hydrochloride removed by filtration. The ether is removed at reduced pressure and the residue washed three times with saturated sodium chloride solution. The benzene solution is then distilled giving 110.6 parts (77%) of dimethyl-β-cyanovinylamine as a pale yellow liquid boiling at 93°–99°/0.6–1.0 mm., $n_D^{25}$ 1.5308.

EXAMPLE 2

*Methyl-β-cyanovinylamine*

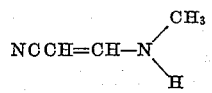

The procedure of Example 1 is repeated substituting an equivalent amount of methylamine for the dimethylamine to give methyl-β-cyanovinylamine.

EXAMPLE 3

*Di-n-propyl-β-cyanovinylamine*

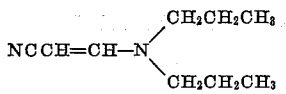

35 parts of β-chloroacrylonitrile are added during a period of 65 minutes to a solution 121.4 parts of di-n-propylamine in 125 parts of benzene while maintaining the temperature of the reaction mixture at 30°–40° C. After addition of 450 parts of ether, the mixture is filtered and the solvents removed at atmospheric pressure. Two distillations at reduced pressure give 57.4 parts (93%) of di-n-propyl-β-cyanovinylamine, a light yellow liquid boiling at 107–109.5° C./0.3 mm.; $n_D^{25}$ 1.5065.

EXAMPLE 4

*n-butyl β-cyanovinylamine*

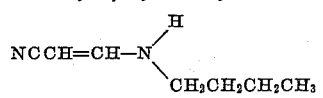

To a stirred solution of 87.8 parts of n-butylamine in 125 parts of benzene is added 35.0 parts of β-chloroacrylonitrile during a period of 30 minutes while maintaining the temperature at 35–40° C. After an additional 15 minutes the mixture is diluted to 1500 parts with ether and the precipitate filtered off. Distillation of the filtrate gives two cuts (1) 8.5 parts B.P. 100–121/.25–.35 mm. and (2) 14.8 parts B.P. 121°/.2–.25 mm., a total of 23.3 parts (47%) of pale yellow n-butyl-β-cyanovinylamine, $n_D^{25}$ 1.5089.

EXAMPLE 5

*Di-2-ethylhexyl-β-cyanovinylamine*

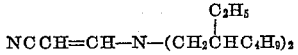

A mixture of 25.8 parts of di-2-ethylhexylamine and 20.4 parts of triethylamine is added to a solution of 17.5 parts of β-chloroacrylonitrile in 80 parts of benzene at 20° C. The by-product amine salt was filtered off and two distillations at reduced pressure gave 12.0 parts of di-2-ethylhexyl-β-cyanovinylamine boiling at 160°/0.4 mm.; $n_D^{25}$ 1.4903.

EXAMPLE 6

Cyclohexyl-β-cyanovinylamine

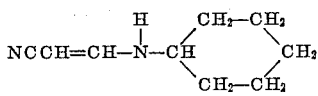

To a stirred solution of 17.5 parts of β-chloroacrylonitrile and 20.4 parts of triethylamine in 80 parts of benzene is added 19.8 parts of cyclohexylamine at 25–30° C. After removal of the by-product amine hydrochloride by filtration, 5.2 parts (20%) of cyclohexyl-β-cyanovinylamine was obtained from the cooled filtrate as light yellow crystals melting at 101.9–102.8° C. Calculated for $C_8H_{12}N_2$: C, 71.96; H, 9.39; N, 18.65. Found: C, 72.03; H, 9.50; N, 18.95.

EXAMPLE 7

N-cyanovinyl piperidine

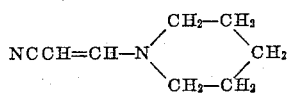

To a stirred solution of 30.4 parts of triethylamine, 25.5 parts of piperidine and 100 parts of ether, there is added 26.3 parts of β-chloroacrylonitrile, the temperature being held below 250° C. by external cooling. The reaction mixture, after standing overnight, is washed with water, dried over anhydrous magnesium sulfate and evaporated leaving 30.6 parts of product, which after recrystallization from ethyl acetate-ligroin melts at 56–57°. Calculated for $C_8H_{12}N_2$; C, 70.54; H, 8.88; N, 20.57. Found: C, 70.76; H, 8.93; N, 20.29.

EXAMPLE 8

N-cyanovinyl morpholine

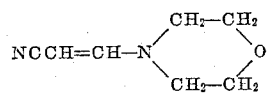

The procedure of Example 7 is repeated substituting an equivalent amount of morpholine for the piperidine to obtain N-cyanovinyl morpholine.

The following example illustrates the copolymerization of a compound according to the present invention with another ethylenically unsaturated monomer.

EXAMPLE 9

180 parts of acrylonitrile and 20 parts of the dimethyl-β-cyanovinylamine of Example 1 in 537 parts of benzene and in the presence of 2 parts of α,α'-azodiisobutyronitrile as a polymerization catalyst are heated together under reflux at the boiling temperature of the reaction mass for one hour. At the end of this time, the copolymer formed is separated by filtration, washed with methanol and then ether, after which it is dried to a constant weight.

5 parts of the copolymer and 5 parts of homopolymeric acrylonitrile are added to separate dye baths consisting of 500 parts of an aqueous solution containing 0.2 part of sulfuric acid, 1 part of sodium sulfate and 0.2 part of Calcocid Alizarine Blue SAPG (Color Index 1054). The dye baths are boiled for 30 minutes after which the polymerization products are filtered off and washed with hot water until the water is free of dye. The copolymer of Example 1 is dyed blue while the homopolymeric acrylonitrile fails to absorb any dye.

We claim:
1. Dimethyl-β-cyanovinylamine.
2. Dipropyl-β-cyanovinylamine.
3. Butyl-β-cyanovinylamine.
4. Cyclohexyl-β-cyanovinylamine.
5. Di-2-ethylhexyl-β-cyanovinylamine.
6. N-β-cyanovinyl piperidine.
7. N-β-cyanovinyl morpholine.
8. A compound selected from the group consisting of N-β-cyanovinyl piperidine, N-β-cyanovinylmorpholine, and β-cyanovinylamines of the formula

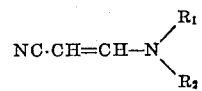

in which $R_1$ and $R_2$ are selected from the group consisting of hydrogen and alkyl hydrocarbon radicals of from 1 to 8 carbon atoms.

References Cited in the file of this patent

UNITED STATES PATENTS

| | | |
|---|---|---|
| 2,211,152 | Nicodemus | Aug. 13, 1940 |
| 2,459,420 | Erickson | Jan. 18, 1949 |

OTHER REFERENCES

Chem. Abstracts Decennial Index. vol. 31–40 (1937–46), page 8093, col. 1.